C. LEHMAN.
LIFTING TACKLE.
APPLICATION FILED JULY 6, 1915.
1,197,135.
Patented Sept. 5, 1916.
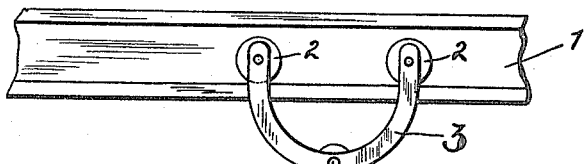
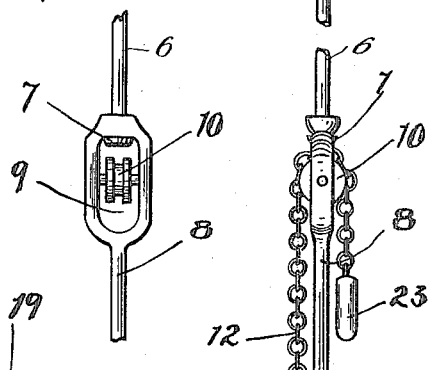
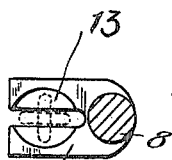
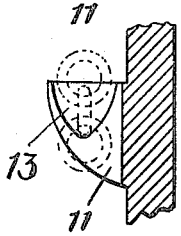
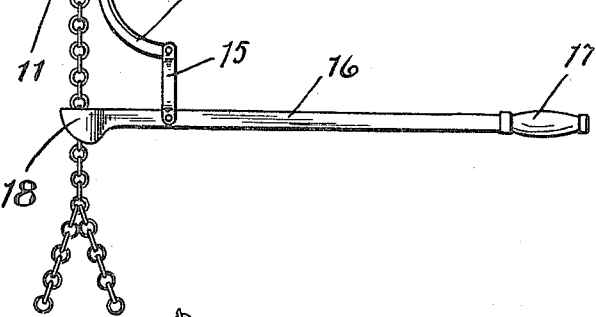
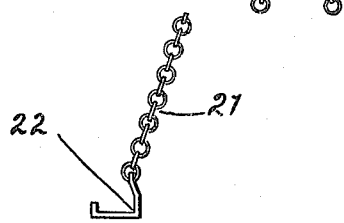
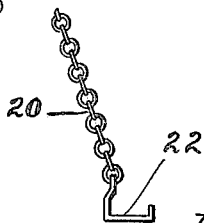
Witnesses
R. M. McCormick
A. L. Phelps
Inventor
Christian Lehman
By
C. C. Phelps Reed
Attorney

UNITED STATES PATENT OFFICE.

CHRISTIAN LEHMAN, OF COLUMBUS, OHIO.

LIFTING-TACKLE.

1,197,135.	Specification of Letters Patent.	Patented Sept. 5, 1916.

Application filed July 6, 1915. Serial No. 38,049.

*To all whom it may concern:*

Be it known that I, CHRISTIAN LEHMAN, a citizen of the United States, residing at Columbus, in the county of Franklin and State of Ohio, have invented certain new and useful Improvements in Lifting-Tackle, of which the following is a specification.

My invention relates to lifting tackle to be used as a substitute for a jack or the like in lifting heavy packages, etc., from the floor. In this connection my invention is particularly adaptable for use in connection with motor vehicles in jacking up the front or rear axles or in transporting the various parts of an automobile from place to place.

The main object of my invention resides in the provision of a structure utilizing a chain, this chain being provided with means of attachment to the object to be transported and a manually operable lever working in conjunction with this chain whereby the same may be elevated as may be desired.

A further object of my invention resides in so mounting and assembling the chain in connection with its supporting structure that a swivel connection is provided whereby the chain and its support may be made to assume any desired rotative angle.

Still a further object of my invention resides in the provision of a counterweight structure designed for use on the idle end of the chain to automatically take the same up as the chain is being elevated. In this manner, the idle end of the chain is always maintained taut and requires no further manipulation to remove it out of any possible position of interference with the work of the operator.

The preferred embodiment of my invention is shown in the accompanying sheet of drawings, in which similar characters of reference designate corresponding parts, and in which:

Figure 1 is a view in side elevation showing my improved lifting tackle in assembled relation, Fig. 2 is a view of the swivel connection taken at right angles to that shown in Fig. 1, Fig. 3 is a top plan view of the hook end of the operating lever, Fig. 4 is a longitudinal vertical section of the structure shown in Fig. 3, Fig. 5 is a section through the base bar taken on line 5—5 of Fig. 1, and, Fig. 6 is a vertical longitudinal section of the structure shown in Fig. 5.

In these drawings, there is shown a trolley structure in the nature of an I-beam 1, the horizontal legs of this I-beam serving as trackways upon which rollers 2 are adapted to rotate. These rollers 2 are rotatably journaled in the upper ends of a pair of yoke members 3 located side by side and held spaced by means of a pin shown at 4. The hook end 5 of a connection rod 6 is hung over this pin 4 and it is by means of the connecting rod 6 that the remaining portion of the lifting tackle is held suspended.

Reference to Fig. 2 will show that the lower end of the connecting rod 6 is riveted as is shown at 7, this rivet being the means of holding the base bar designated generally by the reference numeral 8 in position and serving as a swivel connection between the two. The upper end of the base bar 8 is provided with an enlarged eye 9 in which a sheave 10 is rotatably journaled. This base bar 8 is also provided adjacent its lower portion with a forwardly projecting bifurcated catch hook 11, this hook being designed to coöperate with a chain 12, as will be presently described. Figs. 5 and 6 show that the inside walls of the legs forming the hook 11 are slightly dished as is shown at 13, to thereby more positively hold the chain in position by forming a suitable seat into which its various links may fit. The extreme lower end of the base bar 8 is curved rearwardly as is shown at 14 and to the outer end of this curved portion there is pivotally mounted a link 15. The opposite end of this link is also pivotally connected to an operating lever 16, this pivot connection being intermediate the handle portion 17 of this lever and its bifurcated catch hook 18, this catch hook being very similar in construction to the hook shown at 11, since it is provided with similarly arranged dished portions as shown at 19. These hook portions 11 and 18 are designed to coact with the links of the chain 12 as has already been related.

The lower end of the chain may be equipped with any preferred structure for attachment to a vehicle or other article to be transported, as for instance by dividing the chain into strands 20 and 21 and equipping their lower ends with grappling hooks shown at 22. After they have been securely attached, the operating lever 16 may be gripped and by a downward pressure on the handle portion 17, the chain itself will be elevated because of the gripping connection between the hook portion 18 and this chain. In order that the chain may continue in its elevation throughout its entire length, I have provided a counterweight 23 and attached this counterweight to the extreme end of the idle portion of the chain as is shown in Fig. 1, this idle portion being that portion which has already passed over the sheave 10 during its upward movement. Therefore, the chain below the hook portion 18 is elevated by a downward movement on the handle 17, the upper portion will also move to maintain the chain taut throughout its length under the influence of the counterweight 23 and the frictionless passage over the sheave 10. It will be noted that the link 15 serves as a means for always maintaining the hook end 18 of the lever 16 in proper vertical alinement with the chain itself for, as the hook portion 18 is elevated, it would naturally decrease the distance between its pivot point and the chain were it not for the slight forward swinging of the link 15 and in this manner the inequality in distance is compensated for. The catch hook 11 then comes into play to permit the return movement of the handle 17 by securely engaging one of the links of the chain and thus preventing its return. In this manner the handle 17 may be moved back and forth as many times as is desired and as may be necessary to properly elevate the article to which the chain is attached, from the floor level. In case it is desired to lower the chain with its load, the handle 17 is moved a distance sufficient to loosen the grip between the chain and the catch hooks 11 and this portion of the chain is then manually withdrawn from between the hook portions and the load permitted to settle, the chain being again placed in its operative position between the legs of the hook 11 when the chain is moved downwardly a distance to require the reëngagement of the lever 16. It will also be noted that by means of the swivel connection shown at 7, the handle 16 may be made to assume any position of rotative adjustment to bring it out of interference with any machines or the like filling the room in which the tackle is being used.

Also, the load may be turned around by means of this swivel connection should this be desired.

What I claim, is:

1. A lifting tackle comprising a base bar, a forwardly projecting bifurcated catch hook carried by the lower end of said bar, a sheave journaled in the upper portion of said bar, a chain passing over said sheave and adapted to engage said hook, a counterweight carried by the idle end of said chain, an operating lever carried by said bar, and a catch hook carried by said lever.

2. A lifting tackle comprising a hanger structure, a base bar, a swivel connection between the lower end of said structure and the upper end of said bar, a forwardly projecting bifurcated catch hook carried by the lower end of said bar, a sheave journaled in the upper portion of said bar, a chain passing over said sheave and adapted to engage said hook, a counterweight carried by the idle end of said chain, an operating lever carried by said bar, and a catch hook carried by said lever.

3. A lifting tackle comprising a base bar, a catch hook carried by said bar, a sheave journaled adjacent the upper end of said bar above said hook, a chain passing over said sheave and adapted to engage said hook, an operating lever carried by said bar, and a catch hook carried by said lever.

4. A lifting tackle comprising a base bar, a forwardly projecting bifurcated catch hook carried by the lower end of said bar, a chain adapted to be engaged by said hook, a link pivoted to the lower end of said bar beneath the level of said catch hook, an operating lever pivoted to said link, and a complemental catch hook carried by said lever.

In testimony whereof I affix my signature in presence of two witnesses.

CHRISTIAN LEHMAN.

Witnesses:
C. C. SHEPHERD,
FRANK LEHMAN.

Copies of this patent may be obtained for five cents each, by addressing the "Commissioner of Patents, Washington, D. C."